(12) United States Patent
Rampy

(10) Patent No.: US 6,502,099 B1
(45) Date of Patent: Dec. 31, 2002

(54) METHOD AND SYSTEM FOR EXTENDING THE FUNCTIONALITY OF AN APPLICATION

(75) Inventor: Jefferson A. Rampy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/464,852

(22) Filed: Dec. 16, 1999

(51) Int. Cl.[7] .................. G06F 17/30; G06F 15/163; G06F 15/00
(52) U.S. Cl. .................. 707/101; 707/102; 707/103 R; 707/104; 707/2; 709/302; 712/227
(58) Field of Search ................. 707/203, 101, 707/2, 102, 103 R, 104; 345/335, 352, 326, 348; 709/302; 712/227

(56) References Cited

U.S. PATENT DOCUMENTS

| | | | |
|---|---|---|---|
| 5,291,585 A | 3/1994 | Sato et al. ............... 395/500 |
| 5,307,498 A | 4/1994 | Eisen et al. ............. 395/700 |
| 5,671,417 A | 9/1997 | Miclette et al. ......... 395/704 |
| 5,689,662 A | * 11/1997 | Nakajima et al. ........ 395/326 |
| 5,736,983 A | * 4/1998 | Nakajima et al. ........ 345/335 |
| 5,831,606 A | * 11/1998 | Nakajima et al. ........ 345/326 |
| 5,832,270 A | 11/1998 | Laffra et al. .............. 395/703 |
| 5,838,322 A | * 11/1998 | Nakajima et al. ........ 345/348 |
| 5,852,441 A | * 12/1998 | Nakajima et al. ........ 345/352 |
| 5,878,422 A | 3/1999 | Roth et al. ................. 707/100 |
| 5,978,902 A | * 11/1999 | Mann ........................ 712/227 |
| 6,008,806 A | * 12/1999 | Nakajima et al. ........ 345/335 |
| 6,160,550 A | * 12/2000 | Nakajima et al. ........ 345/335 |
| 6,324,683 B1 | * 11/2001 | Fuh et al. .................. 709/302 |

* cited by examiner

Primary Examiner—Frantz Coby
(74) Attorney, Agent, or Firm—Duke W. Yee; Jeffrey S. LaBaw; Stephen J. Walder, Jr.

(57) ABSTRACT

In an illustrative embodiment of the invention, a method for augmenting the function of a database application begins by inserting one or more hooks at selected locations in a database. One or more programs are then associated with respective hooks to provide the extended functionality for the application. The method then monitors for arrival of data intended for a first selected location in the database. In response to detecting data intended for the first location, data is sent to the program associated with the hook at the first selected location to facilitate the application extension.

31 Claims, 5 Drawing Sheets

METHOD AND SYSTEM FOR EXTENDING THE FUNCTIONALITY OF AN APPLICATION

BACKGROUND OF THE INVENTION

1. Technical Field

The present invention relates generally to computer applications management and, in particular, a method and system for updating a given computer application, for example, by placing at least one trigger or "hook" at a selected location in an underlying database for the application. When the selected location is accessed, the hook initiates a separate program or process which expands the capabilities of the underlying computer application.

2. Description of the Related Art

Large enterprise-wide networks provide a significant challenge to administrators. To meet this challenge, the software industry has developed network management tools to handle problems, changes and assets on a network. An example of this type of software is the Tivoli® Service Desk.

Tivoli® Service Desk is a comprehensive software application for maximizing the efficiency and effectiveness of a corporate service and support operation. The Tivoli® Service Desk suite consists of three integrated applications that help manage functions that are critical to an organization's infrastructure. These applications enable the support staff to better understand and manage the complex relationships between user problems, network events, corporate assets, and changes to the IT infrastructure.

An example application in the Service Desk suite is the Tivoli® Problem Management application. This application automatically tracks, logs, and escalates (to higher levels of support) user interactions and requests. The system includes a sophisticated knowledge engine that enables analysts with different levels of experience to quickly resolve any problem. The application also includes multiple diagnostic technologies that provide online knowledge from a single, integrated knowledge base to ensure consistent, accurate answers.

However, the rapid development pace of technology can render even a flexible and powerful system obsolete. New machines and software are constantly being installed on the network. In addition, there may be legacy support applications that should be integrated to provide a more complete knowledge base. Eventually, something on the network will be installed that was not anticipated when the system management software was written. For example, with simpler technology, a specific series of questions may lead to a specific answer. The Problem Management application is designed to present the necessary questions and, in response to the questions, presents the answer from its knowledge base. However, with more complex technology, the same series of questions may lead to additional questions or the need for the system to gather data from the network. To continue to provide effective support, the application must be modified. In the prior art, modification of the application requires access to the original source code and significant programming resources.

It would be desirable to provide a method for expanding the capabilities of the application without the large investment necessary to rewrite the application. The present invention addresses this need.

BRIEF SUMMARY OF THE INVENTION

It is an object of the present invention to provide a method to expand the capabilities of a given software application without the need to rewrite the application.

It is another object of the present invention to provide a software application with expanded capabilities that operate in the background and without disrupting the application's expected behavior.

It is still another object of the present invention to provide a method for expanding the capabilities of an application to respond to the needs of new technology and/or rapid expansion of an enterprise network.

Yet another more specific object of this invention is to extend a shrink-wrapped application, e.g., a database application, to perform functions beyond the scope of those intended by the application developer.

These and other objects are accomplished generally by attaching a configurable, external monitor to the application so that a new function can be delivered that extends the application beyond its original limits yet in a manner transparent to the application.

In an illustrative embodiment, a method for augmenting the function of a database application begins by inserting one or more hooks at selected locations in a database. One or more programs are then associated with respective hooks to provide the extended functionality for the application. The method then monitors for arrival of data intended for a first selected location in the database. In response to detecting data intended for the first location, data is sent to the program associated with the hook at the first selected location to facilitate the application extension.

Another described embodiment of the invention includes a system having an augmented database application comprising: a database application stored in a computer system and that includes one or more hooks at selected locations in a database. One or more programs are associated with respective ones of the hooks to provide the extended application functionality. A listener routine is used to monitor for arrival of data intended for a first selected location in the database. An executor routine is responsive to the detection of data intended for the first location by the listener routine. The executor routine sends the data to the program associated with the hook located at the first selected location.

The foregoing has outlined some of the more pertinent features of the present invention. These should be construed to be merely illustrative of some of the more prominent features and applications of the invention. Many other beneficial results can be attained by applying the disclosed invention in a different manner or by modifying the invention as will be described. Accordingly, a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
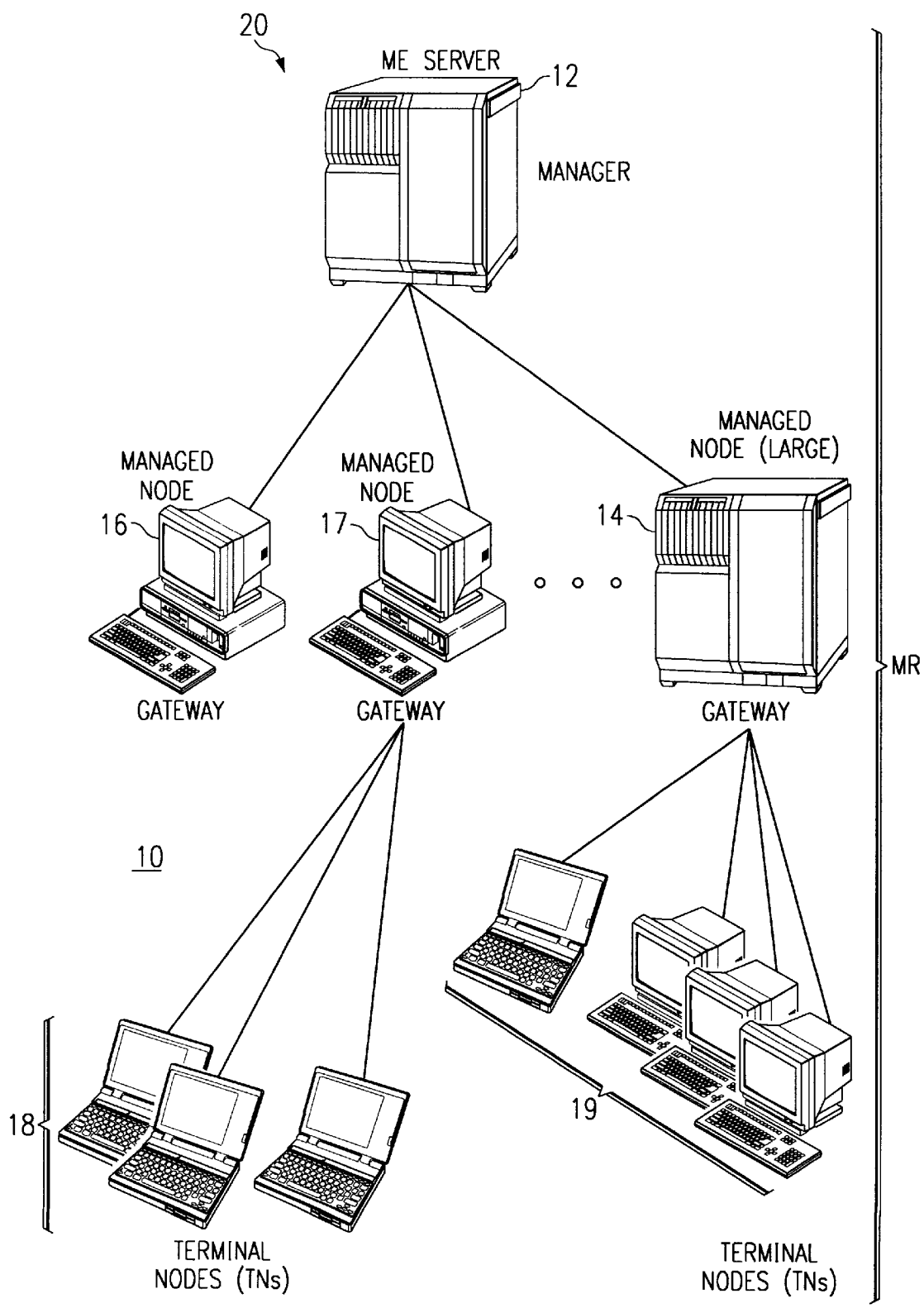
FIG. 1 illustrates a simplified diagram showing a large distributed computing enterprise environment in which the present invention is implemented.

Referring now to FIG. 1, the invention is preferably implemented in a large distributed computer environment 10 comprising up to thousands of "nodes". The nodes typically are geographically dispersed and the overall environment is said to be "managed" in a distributed manner. Preferably, the management environment (ME) is broken down logically into a series of loosely-connected managed regions (MR), each with its own management server 12 for managing local resources within the MR. The network typically includes other servers (not shown) for carrying out other distributed network functions. These include name servers, security servers, file servers, thread servers, time servers and the like. Multiple servers 12 coordinate activities across the enterprise and permit remote site management and operation. Each server 12 serves a number of gateway machines 14, 16 and 17, each of which in turn support a plurality of endpoints 18 and 19. In this configuration, gateway 14 also is a server. Server 12 preferably coordinates all activity within the MR.

Servers 12 and 14 provide network resources such as data storage space, application services and many other services known to be provided by servers in a network. Preferably, the servers 12 and 14 are computers including a IBM RS/6000® processor running the AIX operating system, preferably version 3.2.5 or greater. Suitable alternative machines include an IBM-compatible PC x86 or higher running Windows NT® or Linux, a Data General AViion® series running DG/UX version 4.2, SCO UnixWare® 2.1 or greater, a Hewlett Packard 9000/700 or 800 series running HP UX 9.0 or greater, a Compaq AlphaServer® running Digital UNIX or Windows NT, or a Sun Enterprise 10000 series running Solaris® 7. Of course, other machines and/or operating systems may be used as well for the server machines.

Workstations 16, 17 and 19 are connected directly to the network using known techniques such as Ethernet networks, token ring networks, and the like. Wireless connections may also be used. Workstations 16, 17 and 19 are preferably x86 or RISC processor-based personal computers running IBM OS/2®, Linux, BeOS, Windows® 98 or Windows NT®. Alternative Unix based workstations produced by IBM, Sun, Hewlett-Packard and others may be used as well. In this illustrative example, workstation 17 serves as a dial-up server for laptop computers 18. This provides convenient access for mobile users. Laptop computers 18 are preferably x86 based machines such as the IBM Thinkpad® series running a suitable operating system such as IBM OS/2® or windows® '98.

Figure 2:
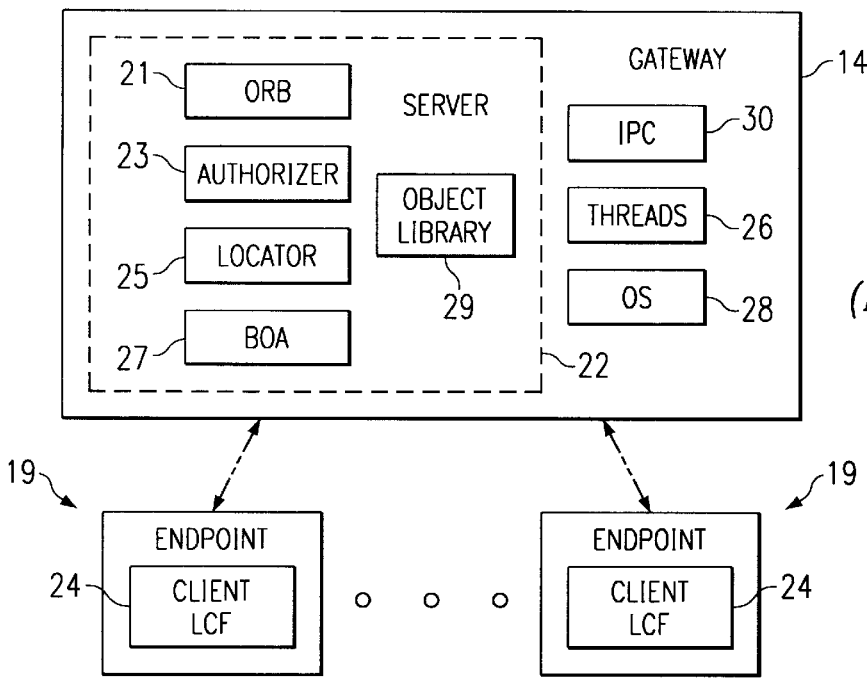
FIG. 2 is a block diagram of a preferred system management framework illustrating how the framework functionality is distributed across the gateway and its endpoints within a managed region.

Referring now to FIG. 2, each gateway machine, such as server 14, preferably runs a server component 22 of a system management framework. The server component 22 is a multi-threaded runtime process that comprises several components: an object request broker or "ORB" 21, an authorization service 23, object location service 25 and basic object adapter or "BOA" 27. Server component 22 also includes an object library 29. Preferably, the ORB 21 runs continuously, separately from the operating system, and communicates with both server and client processes through separate inter-process communication (IPC) facilities 30. In particular, a secure remote procedure call (RPC) is used to invoke operations on remote objects. Gateway server 14 also includes an operating system 28 and a threads mechanism 26.

Figure 3:
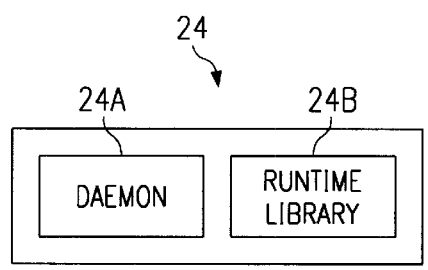
FIG. 3 is a block diagram of the elements that comprise the lightweight client framework ("LCF") client component of the system management framework.

The system management framework preferably includes a client component 24 supported on each of the endpoint machines, such as workstations 19. The client component 24 preferably is "dataless" in the sense that the system management data is not cached or stored there in a persistent manner. This is a known product called the Tivoli lightweight client framework ("LCF"). The LCF has two main parts as illustrated in FIG. 3: the LCF daemon 24a and an application runtime library 24b. The LCF daemon 24a is responsible for endpoint log-in and for spawning application endpoint executables. Once an executable is spawned, the LCF daemon 24a has no further interaction with it. Each executable is linked with the application runtime library 24b, which handles all further communication with the gateway. The runtime library includes a query agent that is started upon receipt of a management query and then is used to effectuate a given management operation.

Implementation of the management framework in this "client-server" manner has significant advantages, and it facilitates the connectivity of personal computers into the managed environment. Using an object-oriented approach, the system management framework facilitates execution of system management tasks required to manage the resources in the MR. Such tasks are quite varied and include, without limitation, file and data distribution, network usage monitoring, user management, printer or other resource configuration management, and the like.

Figure 4:
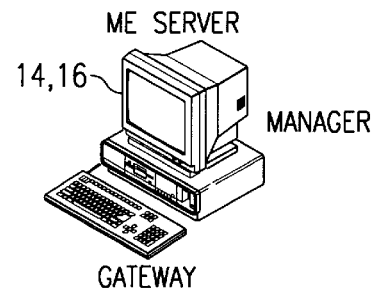
FIG. 4 illustrates a smaller "workgroup" implementation of the enterprise in which the server and gateway functions are supported on the same machine.

In the large enterprise such as illustrated in FIG. 1, preferably there is one server per MR with some number of gateways. For a workgroup-size installation (e.g., a local area network) such as illustrated in FIG. 4, a single server-class machine may be used as the server and gateway, and the client machines run the lightweight client framework (LCF) as previously described. References herein to a distinct server and one or more gateway(s) should thus not be taken by way of limitation, as these elements may be combined into a single platform. For intermediate size installations, the MR grows breadth-wise with additional gateways being used to balance the load of the end points.

The server is the top-level authority over all gateways and endpoints. In particular, the server maintains an endpoint list, which keeps track of every endpoint in a managed region. The list preferably contains all information necessary to uniquely identify and manage each endpoint including, without limitation, such information as name, location, and machine type. The server also maintains the mapping between each endpoint and gateway, and this mapping is preferably dynamic. As noted above, there are one or more gateways per managed region. Preferably, a gateway is a fully-managed node that has been configured to operate a gateway. As endpoints log in, the gateway builds an endpoint list for its endpoints. The gateway's duties preferably include: the setting for endpoint log-in requests, the setting for endpoint update requests, and (its main task) acting as a gateway for method invocations on endpoints.

The above-described framework is a known end-to-end, cross-platform network management scheme that provides a core set of management services and various management applications. As already noted, given management operations in the managed environment may be carried out by "agents". An agent is a specialized low-impact software module or routine that is deployed to a client node and that is useful for executing some local management task. Thus, for example, the management server may include a discovery mechanism that provides automatic discovery of managed nodes, gateways and connected managed regions. The mechanism deploys the software agents, which identify information about managed devices and make it available to a network managing system. A representative discovery mechanism of this type is described in more detail in Ser. No. 09/089,961, titled "System, Method And Computer Program Product For Discovery In A Distributed Computing Environment." That application is assigned to the assignee of the present invention and is incorporated herein by reference.

Figure 5:
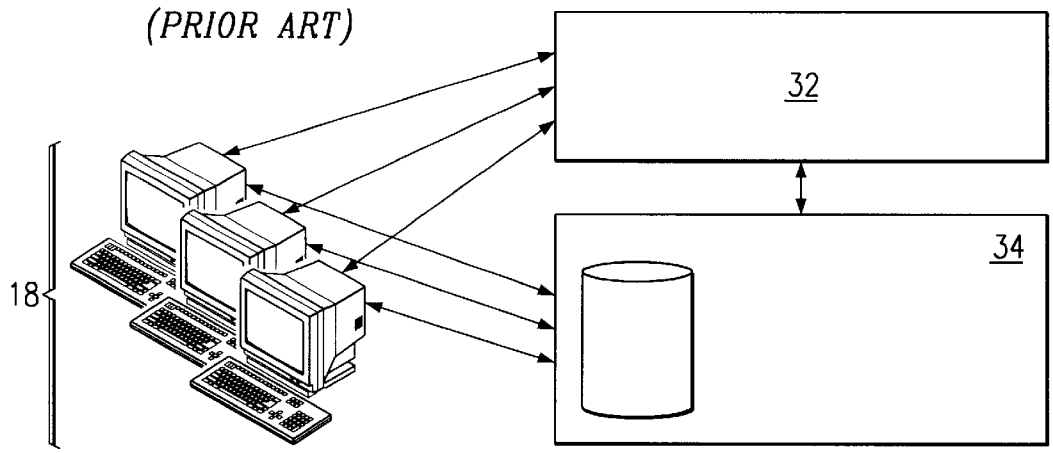
FIG. 5 is a schematic diagram of a prior art application that provides assistance to information technology staff providing user support.

The support function for a large network requires sophisticated tools to provide optimum service to the users of the network. An example of such a tool is illustrated in FIG. 5. A set of workstations 18 are provided to support staff to allow access to support application 32. Support application 32 is a network supported tool that gathers information from various portions of the network using the agents, gateways and managers of network 20 (FIG. 1). This information is stored in database 34 to allow for rapid access. In addition to the network data, application 32 provides a system for tracking problems presented by users. A key element of the problem tracking is the work ticket. For each trouble call from a user to the support staff, a work ticket is created and stored as a record in database 34. The combined information from the tickets and the network information provides powerful tools for network management and trouble shooting.

Figure 6:
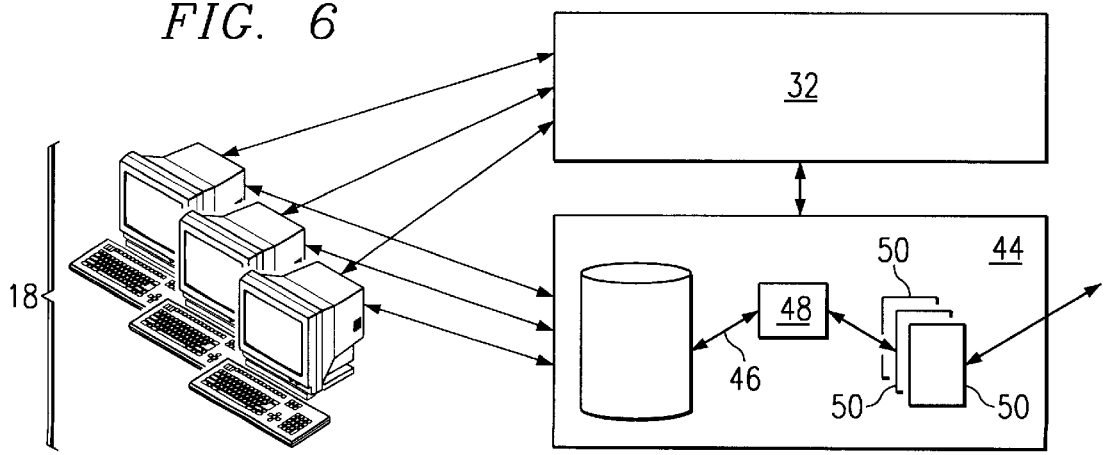
FIG. 6 is a block diagram of one embodiment of the present invention.

FIG. 6 illustrates an embodiment of the present invention. The system illustrated in FIG. 6 provides enhanced functionality to an application, which for illustration purposes only is the support application described in FIG. 5. As noted above, the need for enhanced functionality can arise from many sources. For example, additional elements of the network that were not contemplated by the developers of an application may be added to the network. As another example, an organizational structure of the network, the users or the support staff may be implemented that was not contemplated by the developers of the support application. As yet another example, an enterprise may include legacy applications which must be integrated into the application. Although the examples shown herein are to support applications, the invention is in no way limited to use with support applications. Any application using a database can advantageously use the present invention.

The embodiment of FIG. 6 includes a database 44 that has been enhanced according to the present invention. To provide enhanced functionality, so-called triggers or "hooks" are inserted into the database at selected points. These points may be at specific data storage fields or at specific records. When application 32 calls for storage, update or retrieval of information related to a record or field having a hook, the hook is triggered into operation. Although it is within the scope of the invention to trigger the hook upon retrieval of data from the hooked location, it is preferable such hooks be triggered upon storage or update of the data at the hooked location. Database 44 uses a commercially available database engine, such as those provided by Oracle® Corporation.

The hook is a script that opens a communication channel 46 to another process and triggers an operation on that process. The hook may be written in any applicable programming language such as C++ or Java®. Also, some database software includes a scripting language that may be used to write hooks, such as Oracle®'s PL/SQL language. The communication channel 46 can be provided by a number of known mechanisms such as pipes or interprocess communications (IPCs) in Oracle®, AIX® or Unix systems, dynamic link libraries in Windows® or OS/2® systems or remote procedure calls in DCE systems. Any channel that allows communication between two or more processes is within the scope of the invention. The hook sends to a listener 48 a code or data indicating the source of the hook. In addition, the hook may send to listener 48 any information necessary to the external process triggered by the hook. Listener 48 is a process (i.e. a set of instruction code) designed to provide a known point for the hook to establish the communications channel 46.

Listener 48 determines the source of the hook and selects one of a plurality of executor routines 50 for controlling execution of the external process or program that provides the enhanced functionality for the database application. An executor routine may provide the enhanced application functionality directly; in the preferred embodiment, however, the executor facilitates the extended application functionality performed by an external process, program or other resource. Examples include retrieving network data, transmitting information to another application, computational operations on data provided via the hook and the return of data for storage in the database 44, and registration to an event log. The present invention is not limited to any particular functionality provided directly or indirectly by a given executor.

Figure 7:
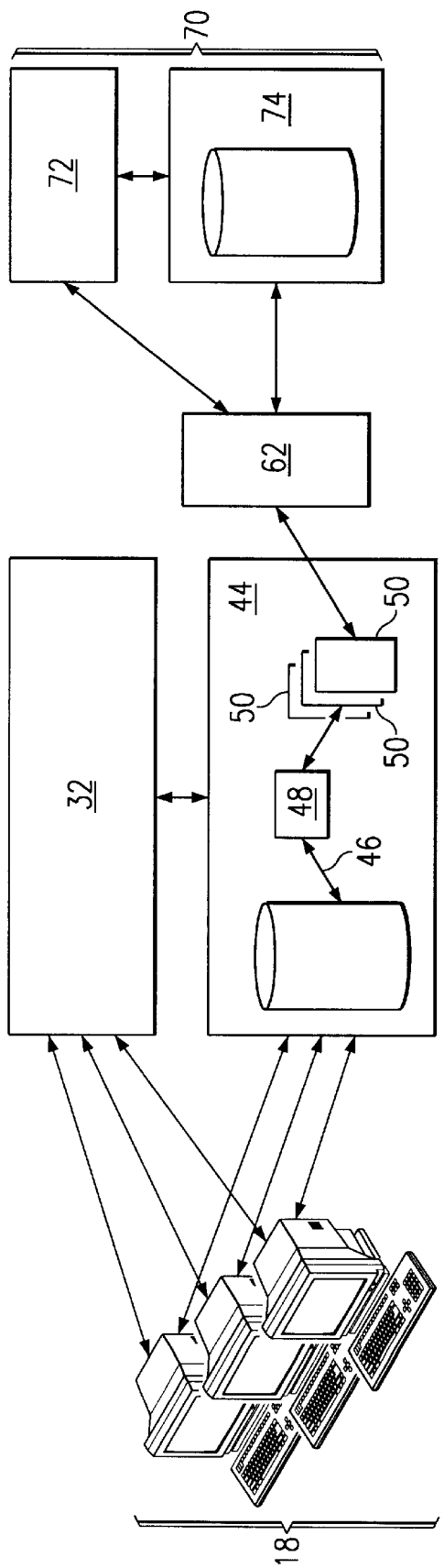
FIG. 7 is a block diagram of another embodiment of the present invention.

FIG. 7 shows an example embodiment providing specific functionality. In the system shown in FIG. 7, application 32 provides data entered into application 32 to legacy application 70 via database 44. In this example, application 70 is a legacy support application. There are many reasons for maintaining such an application. For example, the legacy application may contain a large amount of network data that would be difficult to replace or convert. In addition, the legacy application may have established users and lines of communication. It may be expensive or difficult to retrain these users or re-establish these lines of communication.

When a ticket is entered into application 32, a hook in database 44 is triggered and a communication path 46 is opened to listener 48. The data from the ticket is transmitted to listener 48. The appropriate executor 50 is initiated by listener 48 and the data from the ticket is transferred to executor 50. Executor 50 then establishes communication with gateway server 62 and transfers the data. Gateway server 62 accepts the data in the ticket and reformats it into the appropriate format for database 74. A record is made in database 74 and the information from the ticket generated on application 32 is stored in database 74. This makes the information available to users of application 72.

Figure 8:
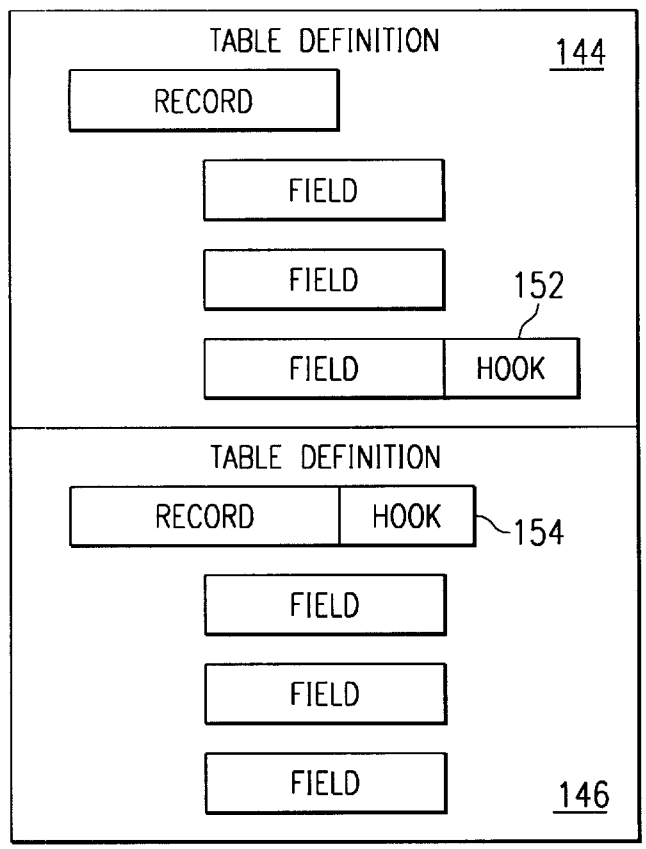
FIG. 8 is an illustration of a representative structure of a table according to an embodiment of the invention.

FIG. 8 is an example illustrating one method of providing database hooks in accordance with the present invention. Table definitions 144 and 146 are a portion of database 44 of FIG. 6. Table definitions 144 and 146 define the structure of tables within database 44. Typically, an application will have many tables defined in the database. The table definition section is a preferable place for the hooks 152 and 154 because it is more common to provide a functionality extension that is triggered by access to a type of data than by access to a specific data record or field.

Data for databases is typically stored in files separate from the coding for an application. In an illustrative embodiment, the hooks are entered into the database files by parsing the database files, finding an appropriate data element for a particular hook, and adding the appropriate hook. As can be seen, preferably it is not required to modify the application itself to facilitate the present invention; rather, only the database is modified to insert the hook. One of ordinary skill in the art will appreciate that this technique provides an easy and safe method for adding functionality to an application. When the application accesses the database, preferably it does not know whether a hook is present or not. The application itself is unaffected. This minimizes the possibility that an extension may introduce a defect into the application. Also, as is well-known, database files are structured and highly regular. This makes developing a program that parses the database files and inserts the hooks much easier than modifying the application code itself. Indeed, in many circumstances, the source code for an application is unavailable, making direct modification of the application nearly impossible.

Figure 9:
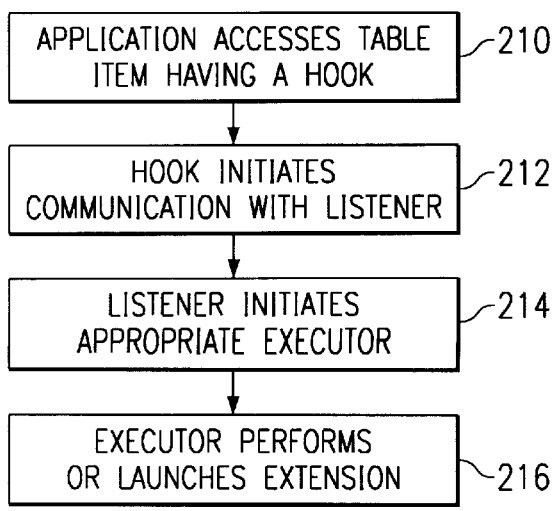
FIG. 9 is a flowchart illustrating the operation of an embodiment of the invention.

FIG. 9 is a flow diagram illustrating a process flow for an illustrative embodiment of the invention. An application extension is triggered by access of the application database at an item having an embedded hook at step 210. The hook opens communication with a listening program at step 212. The listening program determines the appropriate execution program and forwards the data to the appropriate executor at step 214. The executor then performs the operation or launches an extension to provide the desired functionality.

Although specific embodiments of the present invention are described herein, they are not to be construed as limiting the scope of the invention. Many applications of the present invention will become apparent to those skilled in the art in light of the teachings of this specification. For example, although the listener and executor are shown as separate processes, a combined process that receives the communication from the hook and executes the extension may be used. In addition, although the preferred embodiment provides extended functionality to a user support application, the invention my be advantageously used in any application using a database. Also, although specific functional extensions are provided in the described examples, any functionality can be triggered by access to a hooked data element. The scope of the present invention is only limited by the claims appended hereto.

What is claimed is:

1. A method for augmenting a database application, comprising:

inserting at least one hook at a selected data storage location in a database used to support the database application;

associating a given program with the hook;

at the database, determining whether a database access request to the selected data storage location has occurred; and if a database access request to the selected data storage location has occurred, calling the given program associated with the hook to extend a given function of the database application, wherein the database access request is selected from the group consisting of:

a storage of data in the selected data storage location, an update of data stored in the selected data storage location, and a retrieval of data stored in the selected data storage location.

2. The method as described in claim 1 wherein the step of calling the given program includes the steps of:

sending a copy of the given data to the program; and storing the given data in the database.

3. The method as described in claim 2 wherein the given data is intercepted and sent to the program and after processing by the program a result is stored in the database.

4. The method as described in claim 1 wherein the database application is a customer support application.

5. The method as in claim 1 wherein the hook opens a communications like to the program.

6. The method as in claim 5 wherein data intended for the selected data storage location is transmitted to the program using the communications link.

7. The method as in claim 1 wherein the program is a legacy application.

8. A method for augmenting the function of a database application comprising the steps of:

inserting one or more hooks at the selected locations in a database;

associating one or more program with respective hooks;

monitoring for arrival of data intended for a first selected location; and responsive to detecting data intended for the first location, sending the data to the program associated with the hook at the first selected location.

9. The method as in claim 8 wherein a copy of the data is sent to the process and the original data is stored in the database.

10. The method as in claim 8 wherein the data is intercepted and sent to the process and after processing by the process a result is stored in the database.

11. The method as in claim 8 wherein the database application is a customer support application.

12. The method as in claim 8 wherein the hook opens a communications link to the process.

13. The method as in claim 12 wherein the data intended for the first selected location is transmitted to the process using the communication link.

14. The method as in claim 8 wherein the process is a legacy application.

15. A system including an augmented database application comprising:

at least one processor;

a memory;

a database application stored in the memory for operation on the processor including one or more hooks at selected locations in a database;

one or more programs associated with respective one of the hooks;

a listener monitoring for arrival of data intended for a first selected location; and an executor responsive to detecting data intended for the first location, the executor sending the data to the program associated with the hook at the first selected location.

16. The system as in claim 15 wherein a copy of the data is sent to the program and the original data is stored in the database.

17. The system as in claim 15 wherein the data is intercepted and sent to the program and after processing by the program a result is stored in the database.

18. The system as in claim 15 wherein the database application is a customer support application.

19. The system as in claim 15 wherein the hook opens a communications link to the program when the selected location is accessed.

20. The system as in claim 19 wherein the data intended for the first selected location is transmitted to the program using the communications link.

21. A system including an augmented database application comprising:
- at least one processor;
- a memory;
- a database application stored in the memory for operation on the processor including one or more hooks at selected data storage locations in a database;
- one or more programs associated with respective one of the hooks;
- means for monitoring access to a first selected data storage location in the database and executing the program associated with the hook at the first selected data storage location when the first selected data storage location is accessed, wherein the access to the first selected data storage location is an access selected from the group consisting of:
  - a storage of data in the first selected data storage location, an update of data stored in the first selected data storage location, and a retrieval of data stored in the first selected data storage location.

22. The system as in claim 21 wherein a copy of the data is sent to the program and the original data is stored in the database.

23. The system as in claim 21 wherein the data is intercepted and sent to the program and after processing by the program a result is stored in the database.

24. The system as in claim 21 wherein the hook opens a communications link to the program when the first selected data storage location is accessed.

25. The system as in claim 24 wherein the data intended for the first selected data storage location is transmitted to the program using the communications link.

26. A computer program product in a computer-usable medium for augmenting a database application, comprising:
- one or more hooks for inclusion at selected locations in the database;
- one or more programs associated with respective one of the hooks;
- a listener monitoring for arrival of data intended for a first selected location; and
- an executor responsive to detecting data intended for the first location, the executor sending the data to the program associated with the hook at the first selected location.

27. A computer program product as in claim 26 wherein the database application provides a user support function.

28. A computer program product as in claim 26 wherein the hook opens a communications link to the program when the selected location is accessed.

29. A computer program product in a computer-usable medium for augmenting a database application, comprising:
- one or more hooks for inclusion at selected data storage locations in the database;
- one or more programs associated with respective one of the hooks;
- means for monitoring access to a first selected data storage location in the database and executing the program associated with the hook at the first selected data storage location when the first selected data, storage location is accessed, wherein the access to the first selected data storage location is an access selected from the group consisting of:
  - a storage of data in the first selected data storage location, an update of data stored in the first selected data storage location, and a retrieval of data stored in the first selected data storage location.

30. A computer program product as in claim 29 wherein the database application provides a user support function.

31. A computer program product as in claim 29 wherein the hook opens a communications link to the program when the first selected data storage location is accessed.

* * * * *

UNITED STATES PATENT AND TRADEMARK OFFICE
CERTIFICATE OF CORRECTION

PATENT NO.    : 6,502,099 B1
DATED         : December 31, 2002
INVENTOR(S)   : Rampy It is certified that error appears in the above-identified patent and that said Letters Patent is hereby corrected as shown below:

<u>Column 8,</u>
Line 11, please delete "like" and insert -- link --.

Signed and Sealed this

Tenth Day of June, 2003

JAMES E. ROGAN
*Director of the United States Patent and Trademark Office*